United States Patent
Yue

(10) Patent No.: US 8,402,474 B2
(45) Date of Patent: Mar. 19, 2013

(54) MESSAGE SENDING METHOD, MESSAGE SENDING DEVICE AND MESSAGE TRANSMISSION SYSTEM

(75) Inventor: Dongsheng Yue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 955 days.

(21) Appl. No.: 12/116,525

(22) Filed: May 7, 2008

(65) Prior Publication Data

US 2008/0288959 A1     Nov. 20, 2008

(30) Foreign Application Priority Data

May 18, 2007   (CN) .......................... 2007 1 0107959
Dec. 14, 2007  (WO) ............... PCT/CN2007/071234

(51) Int. Cl.
*G06F 9/44* (2006.01)
*G06F 15/16* (2006.01)
*H04N 7/173* (2006.01)
(52) U.S. Cl. .......................... 719/313; 709/203; 725/86
(58) Field of Classification Search ................ 709/203; 719/313; 725/86
See application file for complete search history.

(56) References Cited

U.S. PATENT DOCUMENTS

| 6,847,620 | B1 | 1/2005 | Meier | |
|---|---|---|---|---|
| 7,640,301 | B2 * | 12/2009 | Walter | 709/204 |
| 7,716,363 | B1 * | 5/2010 | Eckert | 709/238 |
| 2003/0054820 | A1 | 3/2003 | Kang et al. | |
| 2003/0123453 | A1 | 7/2003 | Ooghe et al. | |
| 2004/0003069 | A1 * | 1/2004 | Wong | 709/223 |
| 2004/0049546 | A1 | 3/2004 | Yoshida | |
| 2004/0244058 | A1 * | 12/2004 | Carlucci et al. | 725/135 |
| 2005/0195817 | A1 | 9/2005 | Chen et al. | |
| 2006/0184695 | A1 * | 8/2006 | Monette et al. | 709/246 |
| 2007/0124454 | A1 * | 5/2007 | Watkinson | 709/223 |
| 2007/0204003 | A1 * | 8/2007 | Abramson | 709/217 |
| 2007/0217416 | A1 * | 9/2007 | Okuda | 370/390 |

FOREIGN PATENT DOCUMENTS

| EP | 1 318 628 A1 | 6/2003 |
|---|---|---|
| EP | 1 335 521 A2 | 8/2003 |
| EP | 1 424 806 A1 | 6/2004 |
| GB | 2 423 438 A | 8/2006 |

OTHER PUBLICATIONS

Written Opinion of the International Searching Authority issued in corresponding PCT Patent Application No. PCT/CN2009/074231, mailed Dec. 31, 2009.
International Search Report issued in corresponding PCT Patent Application No. PCT/CN2007/071234, mailed Mar. 27, 2008.
Office Action issued in corresponding Chinese Patent Application No. 200710107959.5, mailed Jan. 29, 2010.

(Continued)

*Primary Examiner* — Charles E Anya
(74) *Attorney, Agent, or Firm* — Brinks Hofer Gilson & Lione

(57) ABSTRACT

A message sending method is disclosed includes: receiving a message containing a plurality of requested programs, the plurality of requested programs being provided by a plurality of content service systems; separating the received message containing the plurality of requested programs into a plurality of sub-messages; and sending the separated plurality of sub-messages to corresponding ones of the plurality of content service systems. The invention also relates to a message sending device and a message transmission system.

9 Claims, 2 Drawing Sheets

OTHER PUBLICATIONS

Office Action issued in corresponding European Patent Application No. 08008214.2, mailed Feb. 26, 2010.

Office Action issued in corresponding European Patent Application No. 08008214.2, mailed Apr. 6, 2011.

Xiao et al., "Realization and Principles of IGMP Snooping in Networks", Journal of Beijing Institute of Clothing Technology, vol. 24, No. 1, Mar. 2004.

European Search Report issued in corresponding European Patent Application No. 08008214.2; dated Sep. 16, 2008.

Office Action issued in corresponding European Patent Application No. 08008214.2, mailed Aug. 26, 2011.

ETSI, "Digital Video Broadcasting (DVB); Transport of MPEG-2 Based DVB Services over IP Based Networks" ETSI TS 102 034, V1.1.1, Mar. 2005.

Cain, B. et al. "Internet Group Management Protocol, Version 3 Memo—rfc3376" Network Working Group. The Internet Society. Oct. 2002.

* cited by examiner

MESSAGE SENDING METHOD, MESSAGE SENDING DEVICE AND MESSAGE TRANSMISSION SYSTEM

This application claims priorities to Chinese Patent Application No. 200710107959.5, filed on May 18, 2007 and entitled "Message Sending Method, Message Sending Device and Message Transmission System", and International Patent Application No. PCT/CN2007/071234, filed on Dec. 14, 2007 and entitled "Message Sending Method, Message Sending Device and Message Transmission System", the contents of which are incorporated herein by reference in their entirety.

FIELD OF THE INVENTION

The present invention relates to the data communication field, and more particularly to a message sending method, a message sending device and a message transmission system.

BACKGROUND OF THE INVENTION

Internet Group Management Protocol (IGMP) SNOOPING refers to a procedure in which a communication device maintains local multicast forwarding list items by snooping IGMP Join messages or IGMP Leave messages from users so as to determine which member ports a multicast stream is to be forwarded to. During this procedure, the messages of the users are not modified and the communication device should forward uplink and downlink IGMP messages as they were.

In an application scenario of using IGMP SNOOPING in IGMP V3 application context (IGMP V3 SNOOPING), an end user may add sequentially programs of a plurality of Internet Service Providers (ISPs). The ISPs are identified by a Virtual Local Area Network (VLAN) or IP, and a terminal of the user may send a request message containing only one program for requesting the program, and may also send at a time a request message containing the respective (S, G)s of a plurality of programs (in the IGMP V3, each of the multicast programs is identified with an (S, G) in which S indicates an IP address of a source of the program and G indicates a group IP address of the multicast programs).

After the end user orders the program(s) and a multicast router acting as a query device sends a general query message of the IGMP V3, the user terminal can carry a plurality of programs or only one program in a response message upon receipt of the general query message. In the case that a plurality of programs is carried in the response message, as a standard implementation of IGMP SNOOPING, the message will be forwarded to the plurality of ISPs as it was although it carries the plurality of programs. Accordingly, a server of each of the ISPs may receive the response message containing the plurality of programs. The programs in the message belong to different ISPs, and therefore the different ISPs receive the same message, resulting in information leakage. Meanwhile, there may be a hidden security risk. For instance, a program stream may be forwarded in error if the different ISPs identify a program with the same (S, G).

SUMMARY OF THE INVENTION

Embodiments of the invention provide a message sending method, a message sending device and a message transmission system for the purpose of security of message information.

An embodiment of the invention provides a message sending method that includes receiving a message containing a plurality of requested programs, the plurality of requested programs being provided by a plurality of content service systems, separating the received message containing the plurality of requested programs into a plurality of sub-messages, and sending the plurality of sub-messages to corresponding ones of the plurality of content service systems.

An embodiment of the invention provides a message sending device includes a receiving unit adapted to receive a message containing a plurality of requested programs, the plurality of requested programs being provided by a plurality of content service systems, a processing unit adapted to separate the received message containing the plurality of requested programs into a plurality of sub-messages, and a sending unit adapted to send the separated plurality of sub-messages to corresponding ones of the plurality of content service systems.

An embodiment of the invention provides a message transmission system including an access node and an edge router where the access node or the edge router includes a receiving unit adapted to receive a message containing a plurality of requested programs, the plurality of requested programs being provided by a plurality of content service systems, a processing unit adapted to separate the received message containing the plurality of requested programs into a plurality of sub-messages, and a sending unit adapted to send the separated plurality of sub-messages to corresponding ones of the plurality of content service systems.

The message sending method, message sending device and message transmission system according to the embodiments of the invention separate the message into sub-messages according to the different content service systems to which the programs contained in the message belong, each of the sub-messages containing program(s) provided by only one corresponding content service system. Therefore, each of the content service systems can only receive the sub-message of the program(s) provided by the server of its own but can not receive any sub-message of other content service systems so that the security of message information can be guaranteed.

EMBODIMENTS OF THE INVENTION

The technical solutions of the invention are described in further detail in combination with the drawings and embodiments.

The embodiments of the invention are intended to solve the problem in compatibility of different types of user terminals, access devices and access servers for providing multi-ISP multicast services in the IGMP V3 SPOOPING model while guaranteeing information security.

Figure 1:
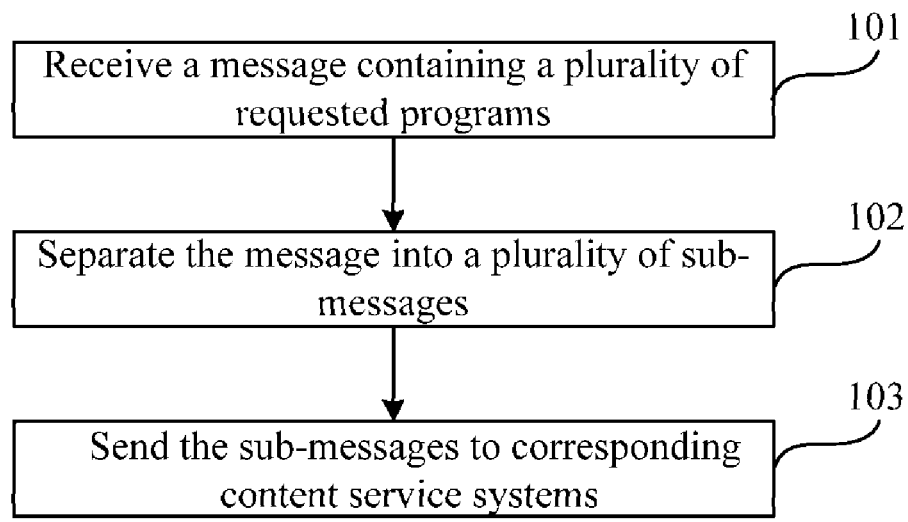
FIG. 1 is a flow chart of a message sending method according to an embodiment of the invention.

In the IGMP V3 (corresponding to rfc3376, Internet Group Management Protocol, Version 3) SNOOPING mode, if an IGMP V3 response message (Report) carries a plurality of programs belonging to a plurality of ISPs, then as illustrated in FIG. 1 which illustrates a flow chart of a message sending method according to an embodiment of the invention, the method particularly includes the following processes.

In Block 101, a message containing a plurality of requested programs is received. The plurality of programs is provided by a plurality of content service systems.

The content service systems may be a server, and may also be a service provider network or system. The different programs in the message are identified with their respective (S, G)s in which S indicates an IP address of a source of the program and G indicates a group IP address of the multicast programs.

In Block 102, the received message containing the plurality of requested programs is separated into a plurality of sub-messages.

The programs belonging to the same content service system may be encapsulated into a sub-message for transmission, and each program may also be encapsulated into a sub-message for transmission. According to the content service system to which the programs belong, the messages into which the programs belonging to the content service system are encapsulated are sent to the content service system. Thus, message encapsulation can be implemented as follows.

Firstly, a plurality of content service systems to which the requested programs contained in the message respectively belong is determined.

Then, the information of the requested programs in the message, which belong to the same content service system, is encapsulated respectively into a sub-message; or information of each requested programs in the message is encapsulated into a sub-message.

The plurality of content service systems to which the requested programs contained in the message respectively belong may be determined in various manners. For instance, they can be determined from respective VLANs where the content service systems to which the programs respectively belong are located. In this way, a VLAN corresponding to a content service system to which a program belongs is specified when the program is defined, the VLAN where the content service system of the source of a requested program contained in the message is obtained from the received message, and finally a VLAN where a sub-message is located is changed into the VLAN where the content service system is located.

Alternatively, the plurality of content service systems may also be determined from respective IPs allocated to the content service systems of the sources of the programs. In an application context of IGMP V3 SSM Mapping, a program is identified with an (S, G). Message encapsulation is implemented depending on the source IP of a program. In the case that a message carries a plurality of programs, the programs with the same source IP are encapsulated into a sub-message, or each program is encapsulated into a sub-message. The IP allocated to the content service system of the source of a requested program contained in the received message is obtained from the message. An interface is found through routing or the VLAN of the message is changed according to a pre-configured IP-and-VLAN correspondence relationship. Then the message is sent.

Message encapsulation may also be implemented by use of an IP of a content service system of a source of a program and a VLAN where the content service system is located. A VLAN corresponding to a content service system to which a program belongs is specified when the program is defined, in order to ensure that a plurality of identical (S, G)s are deployed in different VLANs. In other words, the (VLAN, G) is unique. In this way, in a multi-ISP context, respective ISPs can identify different programs with the same (S, G). Upon receipt of a join message from a user, an ISP obtains from the message an IP of a content service system of a source of a requested program contained in the message and a VLAN where the content service system is located, and finds an interface through routing or changes a VLAN of the user request message into the VLAN corresponding to the content service system through a pre-configured correspondence relationship between the respective IPs of the content service systems and the VLANs to which the content service systems respectively belong.

In Block 103, the separated plurality of sub-messages is sent to the corresponding ones of the plurality of content service systems.

In this process, each of the sub-messages is sent to the content service system to which the requested program(s) contained in the sub-message belongs.

In the sending method according to the embodiment of the invention, the message is encapsulated into sub-messages according to the different content service systems to which the programs contained in the message respectively belong, and each of the sub-messages contains one or more programs provided by only one corresponding content service system. Therefore, each of the content service systems can only receive the sub-messages of the program(s) provided by the server of its own but can not receive any sub-message of other content service systems, so that message information will not be leaked and thereby the security thereof may be guaranteed.

Figure 3:
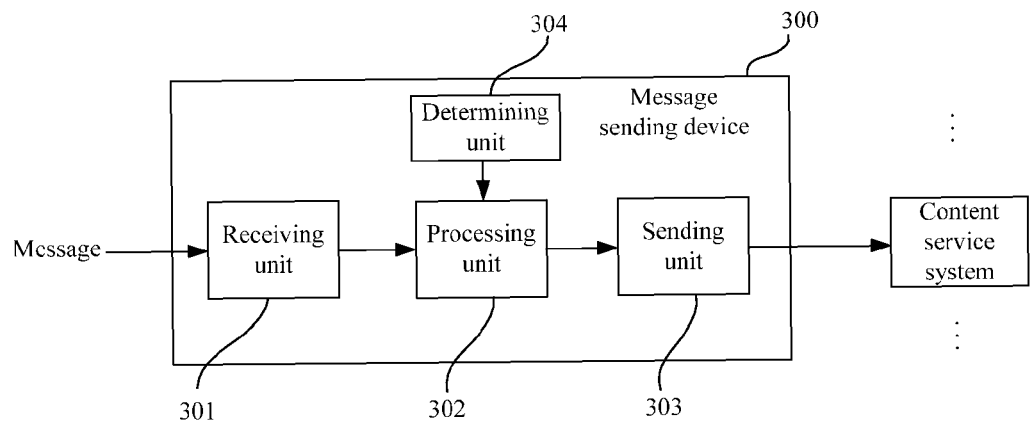
FIG. 3 is a schematic diagram illustrating the structure of a message sending device according to an embodiment of the invention.

Referring to FIG. 3, a message sending device 300 according to an embodiment of the invention includes a receiving unit 301 adapted to receive a message containing a plurality of requested programs, the plurality of requested programs being provided by a plurality of content service systems; a processing unit 302 adapted to separate the received message containing the plurality of requested programs into a plurality of sub-messages by encapsulating information of the requested programs in the message, which belong to the same content service system, respectively into a sub-message or by encapsulating information of each requested program in the message into a sub-element of a sub-message; and a sending unit 303 adapted to send the separated plurality of sub-messages to corresponding ones of the plurality of content service systems. The message sending device 300 may further include a determining unit 304 adapted to determine a plurality of content service systems to which the requested programs contained in the message respectively belong.

Therefore the message sending device 300 according to the embodiment of the invention encapsulates and sends the message according to the content service systems to which the programs in the message respectively belong, instead of forwarding the message as it was, thereby guaranteeing the security of message information.

Figure 4:
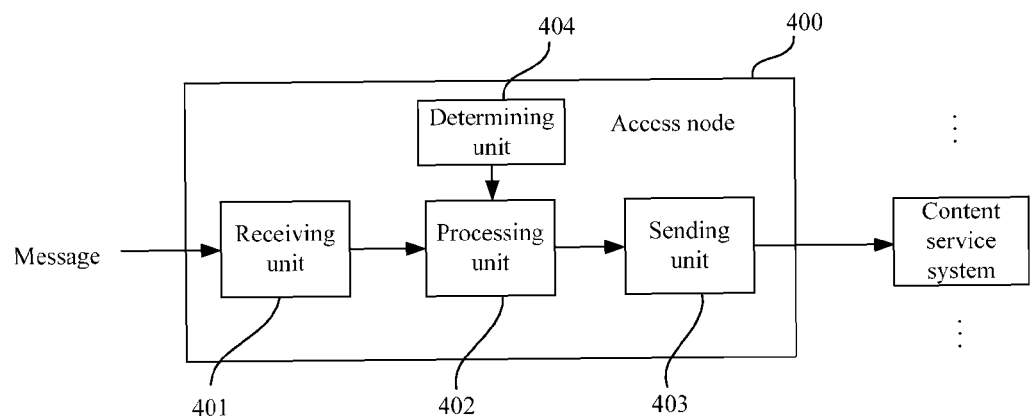
FIG. 4 is a schematic diagram illustrating the structure of an Access Node (AN) according to an embodiment of the invention.

A message transmission system according to an embodiment of the invention includes an Access Node (AN). Referring to FIG. 4, an AN 400 according to an embodiment of the invention includes a receiving unit 401 adapted to receive a message containing a plurality of requested programs, the plurality of requested programs being provided by a plurality of content service systems; a processing unit 402 adapted to separate the received message containing the plurality of requested programs into a plurality of sub-messages by encapsulating information of the requested programs in the message, which belong to the same content service system, respectively into a sub-message or by encapsulating information of each requested program in the message into a sub-element of a sub-message; and a sending unit 403 adapted to send the separated plurality of sub-messages to corresponding ones of the plurality of content service systems. The access node 400 may further include a determining unit 404 adapted to determine a plurality of content service systems to which the requested programs contained in the message respectively belong.

Therefore the message transmission system according to the embodiment of the invention encapsulates and sends the message with the AN 400 according to the content service systems to which the programs in the message respectively belong in view of application and information security, instead of forwarding the message as it was, thereby guaranteeing the security of message information.

Figure 2:
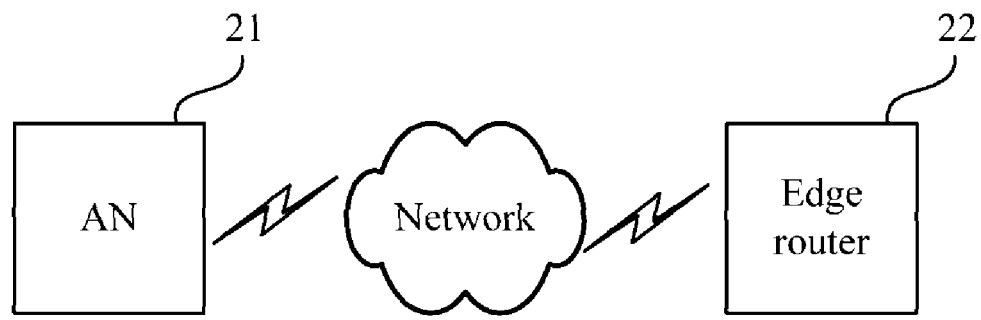
FIG. 2 is a schematic structure diagram of a message transmission system according to an embodiment of the invention.

FIG. 2 is a schematic structure diagram of a message transmission system according to an embodiment of the invention. The message transmission system includes an AN 21 (i.e., an embodiment of a message sending device) adapted to transmit the message transparently and an edge router 22 (i.e., another embodiment of a message sending device). The edge router 22 includes a receiving unit adapted to receive a message containing a plurality of requested programs, the plurality of requested programs being provided by a plurality of content service systems; a processing unit adapted to separate the received message containing the plurality of requested programs into a plurality of sub-messages; and a sending unit adapted to send the separated plurality of sub-messages to corresponding ones of the plurality of content service systems.

Therefore the message transmission system according to the embodiment of the invention encapsulates and sends the message with the edge router according to the content service systems to which the programs in the message respectively belong in view of application and information security, instead of forwarding the message as it was, thereby guaranteeing the security of message information.

It shall be noted that the above embodiments are merely illustrative of the technical solutions of the embodiments of the invention but not restrictive. Although the invention has been detailed with reference to the exemplary embodiments, those ordinarily skilled in the art shall appreciate that modifications or equivalent substitutions may be made to the technical solutions of the embodiments of the invention without departing the principle and scope of the invention as defined in the appended claims.

What is claimed is:

1. A message sending method, comprising:
receiving from an external user's communication device, an Internet Group Management Protocol (IGMP) v3 message for requesting a plurality of content service systems to provide a plurality of requested programs, wherein the IGMP v3 message comprises first address information of the plurality of requested programs, wherein each of the plurality of requested programs is identified with a combination of an S address and a G address within the first address information, the S address indicates an Internet Protocol (IP) address of a source of a corresponding requested program and the G address indicates a group IP address of the corresponding requested program;
separating the received IGMP v3 message into a plurality of IGMP v3 sub-messages, wherein each of the plurality of IGMP v3 sub-messages is encapsulated with second address information from the first address information, wherein the second address information in each of the plurality of IGMP v3 sub-messages identifies a corresponding one or more requested programs from the plurality of requested programs, all of the corresponding one or more requested programs identified by the second address information in each of the plurality of IGMP v3 sub-messages are to be provided by only one corresponding content service system from the plurality of content service systems; and
sending each of the plurality of IGMP v3 sub-messages only to the corresponding content service system.

2. The method according to claim 1, comprising determining which content service systems the plurality of requested programs respectively belong to before separating the received IGMP v3 message into the plurality of IGMP v3 sub-messages.

3. The method according to claim 2, wherein the determining of which content service systems the requested programs respectively belong to comprising:
obtaining from the received IGMP v3 message an IP address of a source of each of the plurality of requested programs; and
determining which content service systems the plurality of requested programs respectively belong to according to a corresponding relationship between IP addresses of sources of requested programs and identifiers of virtual local area networks.

4. The method according to claim 1, further comprising determining which content service systems the plurality of requested programs respectively belong to before separating the received IGMP v3 message into the plurality of IGMP v3 sub-messages.

5. A message sending device comprises an access node or an edge router connecting an external user's communication terminal to a network, wherein the access node or the edge router comprises a processor configured to:
receive from the external user's communication terminal, an Internet Group Management Protocol (IGMP) v3 message for requesting a plurality of content service systems to provide a plurality of requested programs, wherein the IGMP v3 message comprises first address information of the plurality of requested programs, wherein each of the plurality of requested programs is identified with a combination of an S address and a G address within the first address information, the S address indicates an Internet Protocol (IP) address of a source of a corresponding requested program and the G address identified indicates a group IP address of the corresponding requested program;
separate the received IGMP v3 message into a plurality of IGMP v3 sub-messages such that each of the plurality of IGMP v3 sub-messages is encapsulated with second address information from the first address information, wherein the second address information in each of the plurality of IGMP v3 sub-messages identifies a corresponding one or more requested programs from the plurality of requested programs, all of the corresponding one or more requested programs identified by the second address information in each of the plurality of IGMP v3 sub-messages are to be provided by only one corresponding content system from the plurality of content service systems; and
send each of the separated plurality of IGMP v3 sub-messages only to the corresponding content service system.

6. The device according to claim 5, the message sending device is further configured to determine which content service systems the plurality of requested programs respectively belong to.

7. A message transmission system, comprising an edge router which comprises:
- a receiving unit, configured to receive from an external access node via a network, an Internet Group Management Protocol (IGMP) v3 message for requesting a plurality of content service systems to provide a plurality of requested programs, wherein the IGMP v3 message comprises first address information, wherein each of the plurality of requested programs is identified with a combination of an S address and a G address within the first address information, the S address indicates an Internet Protocol (IP) address of a source of a corresponding requested program and the G address indicates a group IP address of the corresponding requested program;
- a processing unit configured to separate the received IGMP v3 message into a plurality of IGMP v3 sub-messages, wherein each of the plurality of IGMP v3 sub-messages is encapsulated with second address information from the first address information, all of corresponding one or more requested programs identified by the second address information in each of the plurality of IGMP v3 sub-messages are to be provided by only one corresponding content service system from the plurality of content service systems; and
- a sending unit configured to send each of the separated plurality of IGMP v3 sub-messages only to the corresponding content system.

8. The system according to claim 7, wherein the edge router further comprises: a determining unit configured to determine which content service systems the plurality of requested programs respectively belong to.

9. A message sending method, comprising:
- receiving from an external user's communication device, a single Internet Group Management Protocol (IGMP) v3 message for requesting a plurality of content service systems to provide a plurality of requested programs, wherein the single IGMP v3 message include address information indicating the plurality of requested programs, wherein each of the plurality of requested programs is identified with a combination of an S address and a G address from the address information, and the S address indicates an Internet Protocol (IP) address of a source of a corresponding requested program and the G address indicates a group IP address of the corresponding program;
- encapsulating first information and second information from the single IGMP v3 message into respective first and second IGMP v3 sub-messages so that the single IGMP v3 message is separated into a plurality of IGMP v3 sub-messages, wherein the first information indicates a first one or more requested programs to be provided by only one of the plurality of content service systems and the second information indicates a second one or more requested programs to be provided by only one of the plurality of content service systems; and
- sending the plurality of IGMP v3 sub-messages only to their respective content service systems.

\* \* \* \* \*